United States Patent [19]

Schoot

[11] Patent Number: 5,083,818
[45] Date of Patent: Jan. 28, 1992

[54] QUICK DISCONNECT FLUID COUPLING

[75] Inventor: Peter A. Schoot, King County, Wash.

[73] Assignee: The Boeing Company, Seattle, Wash.

[21] Appl. No.: 590,170

[22] Filed: Sep. 28, 1990

Related U.S. Application Data

[62] Division of Ser. No. 273,248, Nov. 18, 1988, Pat. No. 4,978,150.

[51] Int. Cl.$^5$ .............................................. F16L 33/16
[52] U.S. Cl. ...................................... 285/81; 285/304; 285/319; 285/906; 285/921
[58] Field of Search ............... 285/304, 321, 261, 262, 285/91, 1, 317, 906, 81, 319, 921

[56] References Cited

U.S. PATENT DOCUMENTS

| | | |
|---|---|---|
| 1,542,335 | 6/1925 | Cardarelli . |
| 2,226,826 | 12/1940 | Miller .......................... 285/304 X |
| 2,413,106 | 12/1946 | Kelle ............................ 285/304 |
| 2,448,688 | 9/1948 | Scheiwer . |
| 2,452,430 | 10/1948 | Clark et al. . |
| 2,674,469 | 4/1954 | Earle et al. ..................... 285/1 X |
| 2,784,987 | 3/1957 | Corcoran . |
| 3,317,220 | 5/1967 | Bruning . |
| 3,667,785 | 6/1972 | Kapeker . |
| 3,773,360 | 11/1973 | Timbers ........................ 285/321 X |
| 3,938,833 | 2/1976 | Miyaoka ....................... 285/261 X |
| 4,240,654 | 12/1980 | Gladjeux ....................... 285/321 X |
| 4,557,261 | 12/1985 | Rugheimer . |
| 4,619,255 | 10/1986 | Spinosa et al. . |

FOREIGN PATENT DOCUMENTS 1034886  4/1953 France .

Primary Examiner—Dave W. Arola
Attorney, Agent, or Firm—Seed and Berry

[57] ABSTRACT

A quick disconnect coupling having a socket and a plug. In one embodiment, the plug has an outwardly projecting ring at its end that is captured behind a plurality of pins of an inwardly stepped shoulder formed in the socket in order to prevent the plug from being withdrawn from the socket. The plug is releasably retained in the socket by a variety of means, including a resilient ring surrounding the plug that tightly fits into a stepped shoulder formed in the socket or circumferentially spaced ball bearings mounted on either the plug or the socket and biased into a groove formed on the socket or plug, respectively. In another embodiment of the invention, the plug is formed by a cylindrical sleeve on which retaining fingers are pivotally mounted. The retaining fingers each terminate in a respective retaining tab that is captured behind an inwardly stepped shoulder formed in the socket. The retaining fingers releasably retain the plug in the socket so that it may be removed by pulling it axially from the socket. An actuating member surrounds the sleeve adjacent the retaining tabs. In the event of pivotal movement of the sleeve, the actuating member contacts the inside surface of at least one retaining tab to prevent the retaining tab from being released from the socket.

6 Claims, 2 Drawing Sheets

QUICK DISCONNECT FLUID COUPLING

This application is a division of U.S. patent application Ser. No. 07/273,248 filed Nov. 18, 1988 now U.S. Pat. No. 4,978,150 issued Dec. 18, 1990.

DESCRIPTION

1. Technical Field

This invention relates to hydraulic and pneumatic connectors and, more particularly, to such connectors that can be quickly and easily connected and disconnected by applying axial forces between a plug and socket.

2. Background Art

Connectors are commonly used to join tubular conduits containing liquid or gaseous fluids. These connectors typically consist of a plug which is inserted into a socket. The plug can mate with the socket using a variety of structures. For example, the plug can be threaded into the socket. However, it is often desirable to be able to quickly and easily disconnect the plug from the socket. As a result, hydraulic and pneumatic connectors have been developed in which a plug can be disconnected from a socket by actuating a lever that releases a coupling mechanism securing the plug to the socket. Connectors have also been developed that resiliently secure the plug within the socket. In this type of connector, the plug is inserted into the socket by merely applying an axial force to the plug relative to the socket. Similarly, the plug is removed from the socket by merely applying an axial force to the plug away from the socket. This connector is commonly used as a quick release breathing air connector for military aircraft known as the CRU-60/P connector (ref: MIL-C-38271A, USAF). While the CRU-60/P connector adequately serves the function of allowing a breathing air hose to be quickly and easily disconnected, it often allows the hose to be inadvertently disconnected. More specifically, the CRU-60/P connector utilizes a resilient ring surrounding the plug that is tightly surrounded by a shoulder in the socket when the plug is inserted into the socket. The end of the plug then abuts a gasket at the end of the recess in which the plug is inserted. Transverse forces applied to the plug, often inadvertently, cause the plug to pivot about the resilient ring, thereby moving the end of the plug axially and forcing the plug from the socket. As a result, the CRU-60/P, and other connectors of similar structure, are susceptible to being inadvertently disconnected.

Inadvertent disconnection of hydraulic and pneumatic connectors can produce extremely grave results. For example, a pilot of a high-speed military aircraft who inadvertently disconnects a breathing air hose can unknowingly black out while climbing to high altitudes. Yet there are times when a pilot must be able to quickly and easily disconnect the breathing air connector. The need to quickly disconnect the connector, often while wearing gloves, makes manipulation of a disconnecting lever or other mechanism impractical.

DISCLOSURE OF THE INVENTION

It is the primary object of the invention to provide a quick disconnect fluid coupling that can be connected and disconnected solely by axial forces yet cannot be disconnected by transverse forces.

It is another object of the invention to provide a quick disconnect coupling of the character described that is relatively simple, inexpensive and light in weight.

These and other objects of the invention are provided by a quick disconnect fluid coupling having a plug fitting into a socket. The socket includes a cylindrical recess having an opening at its distal end. A plug fits into the proximal end of the recess and has a fluid opening at its end connecting with the fluid opening of the socket. A releasable retaining means secures the plug within the socket. The retaining means is engaged and disengaged by applying axial forces between the plug and socket. The retaining means not only releasably secures the plug within the socket, but it also allows the plug to pivot in the socket. A locking means is axially spaced from the retaining means, and is engaged to prevent axial movement between the plug and socket responsive to pivotal movement of the plug within the socket. In one embodiment, the locking means comprises an outwardly projecting circumferential ring mounted on the plug at a location axially spaced from the retaining means. A locking member is then mounted in the recess of the socket. The locking member projects into the recess and has a minimum inside diameter that is slightly larger than the outside diameter of the ring. As a result, the ring can clear the locking member when the plug is pulled axially out of the socket. However, when the plug pivots responsive to transverse loads, the ring is captured behind the locking member, thereby preventing the plug from being removed from the socket. The locking member may assume a variety of forms including a plurality of circumferentially spaced pins projecting into the recess or an inwardly stepped shoulder formed in the socket around the recess. Similarly, the retaining means may assume a variety of forms, including a resilient circumferential ring surrounding the plug which is tightly surrounded by an inwardly projecting shoulder formed in the recess of the socket. The retaining means may also be implemented by a plurality of ball bearings mounted on the plug or socket around the recess and resiliently biased into an annular groove formed on either the socket or plug, respectively. Another embodiment of the invention includes a socket having a generally cylindrical recess with a fluid opening formed at its distal end. An inwardly stepped shoulder is formed in the socket around the recess. A plug fits into the proximal end of the recess. The plug includes a sleeve having a fluid opening at its distal end and a plurality of resilient retaining fingers coaxially surrounding the sleeve. The retaining fingers extend axially along the sleeve and terminate in respective outwardly projecting retaining tabs which are captured behind the step shoulder of the socket when the plug is inserted into the recess. The retaining tabs are pivotally mounted on the sleeve, and an actuating member projects outwardly from the sleeve toward the retaining fingers at a location axially spaced from the location where the retaining fingers are pivotally mounted on the sleeve. The actuating member contacts at least one of the fingers when the sleeve is pivoted within the retaining fingers to force the retaining fingers outwardly so that the respective retaining tabs are held behind the stepped shoulder, thereby preventing the plug from being withdrawn from the socket. When the plug is aligned with the socket, the actuating members are spaced a sufficient distance from the retaining fingers that the retaining fingers can bend inwardly to allow the plug to be pulled axially from the socket.

BEST MODE FOR CARRYING OUT THE INVENTION

Figure 1:
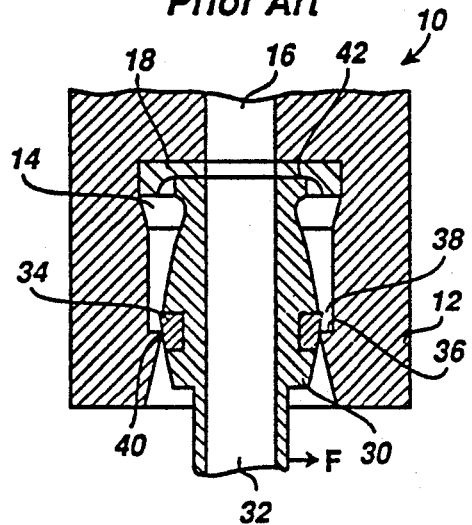
FIG. 1 is a cross-sectional view of a prior art fluid coupling.

A commonly used quick release breathing air coupling, known as the CRU-60/P, is illustrated in FIG. 1. The coupling 10 has a socket 12 in which a generally cylindrical recess 14 is formed. The distal end of the socket 12 has formed therein a central fluid passage 16 through which air, or any other gaseous or liquid fluid, can pass. The distal end of the recess 14 is lined with a resilient gasket 18 to provide a seal as explained in greater detail below.

The prior art CRU-60/P coupling also includes a plug 30 also having a central fluid passage 32. The plug 30 is inserted into the proximal end of the recess 14 until its distal end contacts the gasket 18. The gasket 18 thus provides a seal to prevent fluid flowing through the passages 16, 32 from escaping. A resilient retaining ring 34 extends around the circumference of the plug 30 adjacent in inwardly stepped shoulder 36 formed in the recess 14 of the socket 12 when the plug 30 is fully inserted into the socket 12. The outside diameter of the retaining ring 34 is slightly larger than the inside diameter of the shoulder 36 so that the shoulder 36 slightly compresses the retaining ring 34. Also, as illustrated in FIG. 1, the outer surface 38 of the ring 34 is inclined inwardly away from the distal end of the recess 14. As a result, the outward force exerted by the ring 34 as it is compressed imparts in inward axial force to the plug 30 that maintains its distal end in contact with the gasket 18.

In use, the plug of the CRU-60/P coupling is inserted into the recess 14 by applying sufficient axial force to the plug 30 to compress the wider portion of the ring 34 to place it behind the shoulder 36. When the plug 30 is to be removed from the socket 12, it is pulled out of the recess 14 by applying in outward axial force to the plug 30.

Although the CRU-60/P coupling has the advantages of being quick and easy to connect and disconnect and is light in weight and relatively simple, its principal limitation is its tendency to become inadvertently disconnected. In the event that a transverse or side load is exerted on the proximal end of the plug 30 or to a hose connected to the plug 30, the plug tends to pivot about the interconnection between the ring 34 and the shoulder 36. For example, as illustrated in FIG. 1, a transverse force "F" causes the plug 30 to pivot about 40, thereby causing the distal end of the plug 30 to apply an axial force to the gasket 18 at surface 42. This axial force applied to the gasket 18 at 42 then causes the plug 30 to move axially out of the recess 14, thereby disconnecting the plug 30 from the socket 12. Inadvertent disconnections of this nature can have extremely serious consequences since, for example, the coupling may be supplying the pilot of a high-speed fighter aircraft with the only source of air.

Figure 2:
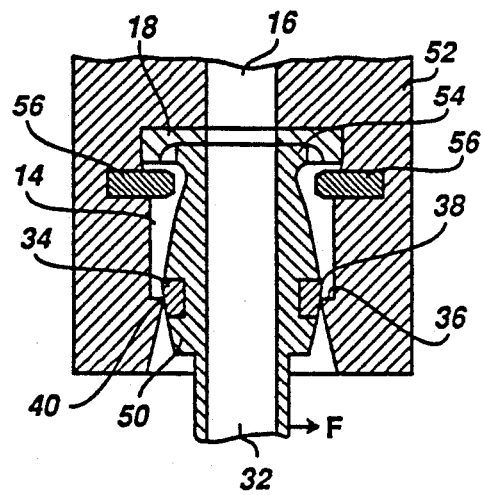
FIG. 2 is a cross-sectional view of one embodiment of the inventive fluid coupling.

One embodiment of an inventive coupling for allowing a plug to be easily and simply removed from the socket by an axial force yet preventing the plug from being removed from the socket by a transverse force is illustrated in FIG. 2. The embodiment of FIG. 2 utilizes a plug 30 that is virtually identical to the plug 30 in the conventional CRU-60/P connector illustrated in FIG. 1 and is thus given the same reference numerals where applicable. Similarly, the socket 52 is very similar to the socket 12 utilized in the CRU-60/P coupling illustrated in FIG. 1 and is thus also given identical reference numerals where applicable. The plug 50 in the embodiment of FIG. 2 has an outwardly projecting retaining ring 54 formed at its end. The socket 52 has mounted in its recess 14 a plurality of circumferentially spaced retaining pins 56.

The outside diameter of the ring 54 is smaller than the spacing between the pins 56 so that the ring 54 can clear the pins 56 when the plug 50 is pulled axially from the recess 14. However, in the event that the plug 50 pivots about point 40 responsive to force "F," the ring 54 moves to the left, as illustrated in FIG. 2. Under these circumstances, the ring 54 is captured behind the leftmost pin 56, thereby preventing the plug 50 from being withdrawn from the recess 14. In this manner, the ring 54 and pins 54 form a locking means that prevents removal of the plug 50 unless the plug 50 is aligned with the axis of the socket 52. Yet the plug 50 can be removed from the socket 52 by applying an outward axial force to the plug 50 in the same manner, and just as easily, as the plug 30 of the prior art CRU-60/P coupling can be removed from its socket 12. Although the embodiment illustrated in FIG. 2 utilizes four such retaining pins 56 spaced 90° apart from each other, it will be understood that as few as three such pins 56 or a number greater than four may be used.

Figure 3:
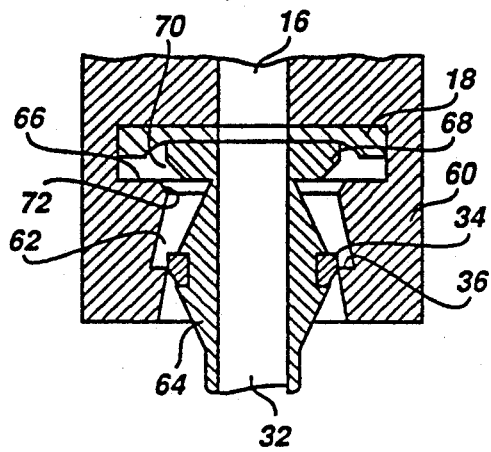
FIG. 3 is a cross-sectional view of another embodiment of the inventive fluid coupling utilizing a stepped shoulder instead of the retaining pins of the embodiment of FIG. 2.

An alternative embodiment of the inventive coupling is illustrated in FIG. 3. As in the embodiment of FIG. 2, the embodiment of FIG. 3 utilizes a socket 60 having a generally cylindrical recess 62, a fluid passage 16 and a gasket 18 covering the distal end of the recess 62. The embodiment of FIG. 3 also utilizes a plug 64 having a fluid passage 32 and a resilient retaining ring 34 fitting into an inwardly stepped shoulder 36 formed in the recess 62. However, the embodiment of FIG. 3 utilizes a second inwardly stepped recess 66 extending around the recess 62 at its distal end instead of the retaining pins 56 illustrated in FIG. 2. Also, the plug 64 utilizes a retaining ring 68 that has a sloped surface 70 matching the sloped surface 72 of the shoulder 66. The outside diameter of the ring 68 is smaller than the inside diameter of the shoulder 66 so that the plug 64 may be removed from the socket 60 by applying an axial force to the plug 64. However, in the event that the plug 64 pivots about the interconnection between a retaining ring 34 and the shoulder 36, the sloped surface 70 of the retaining ring 68 contacts the sloped surface 72 of the shoulder 66 to prevent the plug 64 from being withdrawn from the socket 60.

Figure 4:
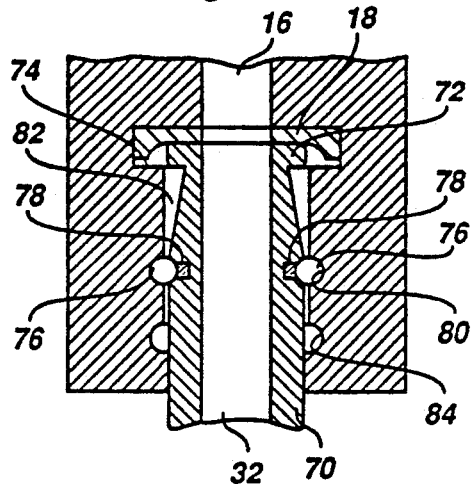
FIG. 4 is a cross-sectional view of another embodiment of the inventive fluid coupling utilizing ball bearings resiliently biased into an annular groove as retaining means instead of the resilient ring and step shoulder of the embodiment of FIG. 2.

Another embodiment of the inventive fluid coupling is illustrated in FIG. 4. Like the embodiment of FIG. 3, the embodiment of FIG. 4 utilizes a plug 70 having an outwardly extending locking ring 72 that is captured behind an inwardly extending stepped shoulder 74 responsive to pivotal movement of the plug 70. However, instead of utilizing the resilient retaining ring 34 and stepped shoulder 36, as in the embodiments of FIGS. 2 and 3, the embodiment of FIG. 4 utilizes a ball bearing retaining means. Specifically, a plurality of ball bearings 76 are mounted around the circumference of the plug 70 by conventional means (not shown) and outwardly biased by respective springs 78. Two of the ball bearings 76 positioned on opposite sides of the plug 70 fit into a first annular groove 80 formed in the socket about a generally cylindrical recess 82. A second set of ball bearings, offset by 90° from the ball bearings 78, are received by a second annular groove 84 formed in the recess 82 at a location axially spaced from the first groove 80.

When the plug is inserted into the socket, the ball bearings 76 are resiliently biased into their respective grooves 80, 84, thereby holding the distal end of the plugs 70 against the gasket 18. The plug 70 can be removed from the socket by pulling the plug 70 outwardly in an axial direction since the outside diameter of the locking ring 72 is smaller than the inside diameter of the stepped shoulder 74. However, if a transverse force is applied to the plug 70, the two rows of ball bearings, being axially spaced from each other, tend to prevent the plug 70 from pivoting. In the event that the transverse force 70 is sufficient to allow the plug 70 to pivot, the locking rings 72 moves transversely so that it is captured behind the stepped shoulder 74, thereby preventing the plug 70 from being withdrawn from the socket. Although the embodiment shown in FIG. 4 utilizes four circumferentially spaced ball bearings, it will be understood that a greater number of ball bearings may be used. Also, although the ball bearings are arranged in two axially spaced rows in the embodiment of FIG. 4, it will be understood that three or more circumferentially spaced ball bearings may be placed in a single annular groove.

Figure 5:
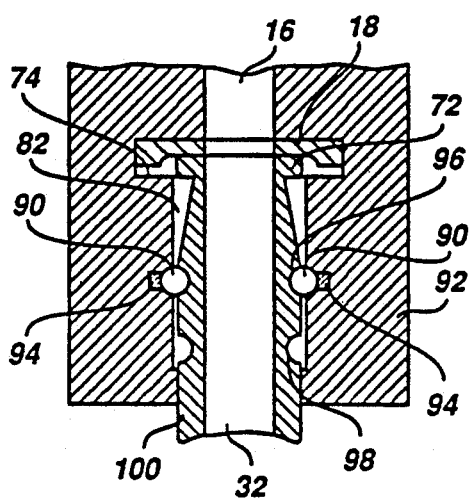
FIG. 5 is a cross-sectional view of another embodiment of the inventive fluid coupling utilizing ball bearings resiliently biased into an annular groove formed on the plug rather than on the socket as in the embodiment of FIG. 4.

With reference now to FIG. 5, an alternative embodiment of the fluid coupling utilizes a retaining mechanism that is essentially the reverse of the retaining mechanism utilized in FIG. 4. Thus, instead of mounting ball bearings 76 on the plug 70, the embodiment of FIG. 5 utilizes ball bearings 90 mounted on the socket 92 circumferentially spaced around the recess 82 in two axially spaced rows. The ball bearings are biased inwardly by respective springs 94. The ball bearings 90 are received in respective, axially spaced circumferential grooves 96, 98 formed in the plug 100. The embodiment of FIG. 5 operates in essentially the same manner as the embodiment of FIG. 4. Also, the embodiment of FIG. 5 may utilize more than four ball bearings 90, and it may utilize a single row of three or more ball bearings 90 that are received in a single annular groove.

Figure 6:
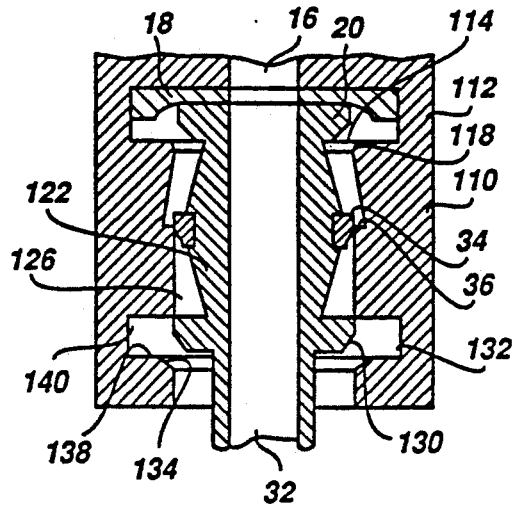
FIG. 6 is a cross-sectional view of another embodiment of the inventive fluid coupling utilizing dual locking means instead of the single locking means utilized in the embodiments of FIGS. 2-5.

Another embodiment of the inventive coupling mechanism utilizing two locking means is illustrated in FIG. 6. The embodiment of FIG. 6 is structurally similar to the embodiment of FIG. 3 in that it includes a socket 110 having a stepped shoulder 112 with an inclined surface 114 matching an inclined surface 118 formed on a locking ring 120 at the end of a plug 122. Also, as in the embodiment of FIG. 3, the embodiment of FIG. 6 utilizes a resilient retaining ring 34 fitting into an inwardly extending shoulder 36 surrounding a recess 126. However, the embodiment of FIG. 6 also includes a second locking ring 130 axially spaced from the retaining ring 34 in the opposite direction from the first retaining ring 120. The retaining ring 130 also has an inclined surface 132 that matches an inclined surface 134 on an inwardly extending stepped shoulder 138 formed by a cylindrical groove 140 in the socket 110 around the recess 126. In the event of pivotal movement of the plug 122 about the interconnection between the retaining ring 34 and shoulder 36, the first locking ring 120 moves transversely in one direction while the second locking ring 130 moves transversely in the opposite direction. As a result, the locking rings 120, 130 are captured behind the stepped shoulders 112, 138, respectively, to prevent the plug 122 from being withdrawn from the socket 110.

The embodiments of 2-6 generally provide some resistance to pivotal movement of their respective plugs. In fact, in the embodiments of FIGS. 4 and 5, the use of axially spaced rows of ball bearings and matching grooves provide significant resistance to pivotal movement of the respective plugs. The embodiment of FIG. 7 departs from this concept by facilitating the pivotal movement of the plug within the socket and relies solely upon the locking means to prevent inadvertent disconnection of the plug from the socket. The embodiment of FIG. 7, like many of the previous embodiments, utilizes a plug 150 having a central fluid passage 152 and a resilient, circumferential retaining ring 154. The embodiment of FIG. 7 also utilizes an outwardly projecting circumferential locking ring 156, but it is located near the proximal end of the recess 158 formed in the socket 160 rather than near the distal end of the recess 158. The socket 160 has formed therein a partial spherical recess 162 in which a partial ball member 164 is slidably received. The ball member 164 has formed therein an inwardly projecting circumferential step 166 that tightly contacts the retaining ring 154 extending around the plug 150. The ball member 164 is free to pivot within the socket 160 responsive to transverse forces applied to the plug 150. However, pivotal movement of the plug 150 and ball member 164 causes the locking ring 156 to move transversely into a cylindrical groove 168 formed in the socket 160. Under these circumstances, the locking ring 156 is captured by an inwardly extending circumferential step 170 formed by the groove 168 to prevent the plug 150 from being removed from the socket 160.

Figure 7:
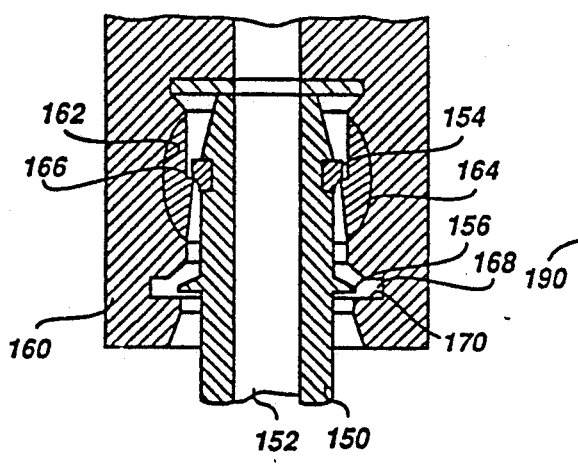
FIG. 7 is a cross-sectional view of another embodiment of the inventive fluid coupling in which the portion of the socket that mates with the plug is mounted in a ball and socket to facilitate pivotal movement of the plug with respect to the socket.
Figure 8:
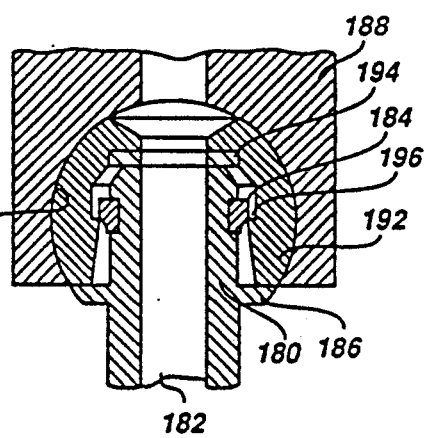
FIG. 8 is a cross-sectional view of another embodiment of the inventive fluid coupling which the portion of the socket mating with the plug is also mounted in a ball and socket joint to facilitate pivotal movement of the plug with respect to the socket.

An alternative embodiment, illustrated in FIG. 8, is somewhat similar to the embodiment of FIG. 7 since it also utilizes a slidably mounted ball member for facilitating pivotal movement of the plug. The plug 180 also has an axial fluid passage 182, a resilient, circumferential retaining ring 184 and an outwardly projecting, circumferential locking ring 186 positioned away from the distal end of the plug 180. However, in the embodiment of FIG. 8, the locking ring 186 is positioned outside of the socket 188 when the plug 180 is aligned with the axis of the socket 188. The socket 188 has formed therein a partial-spherical recess 190 that receives a ball member 192. The ball member 192 includes a gasket 194 and has formed therein an inwardly stepped shoulder 196 that tightly surrounds the resilient retaining ring 184.

The ball member 192 is free to pivot in the socket 188 responsive to transverse forces applied to the plug 180. However, pivotal movement of the plug 180 causes one end of the locking ring 186 to pivot into the semispherical recess 190, thereby preventing the plug 180 from being removed from the socket 188.

Figure 9:
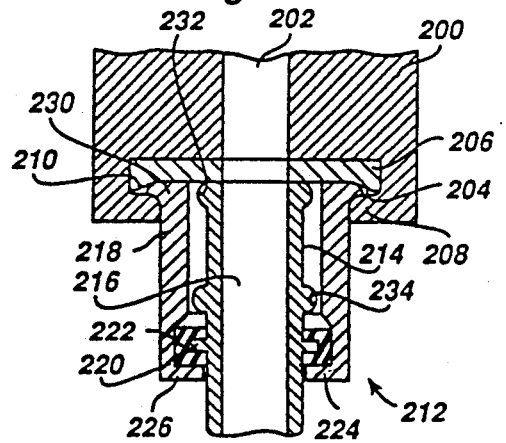
FIG. 9 is a cross-sectional view of still another embodiment of the inventive fluid coupling in which the plug utilizes a plurality of resilient retaining fingers pivotally secured to a sleeve on which actuating members are mounted to lock the retaining fingers to the socket responsive to pivotal movement of the sleeve.

Another embodiment of the inventive fluid coupling that differs somewhat from the embodiment of FIGS. 2-8 is illustrated in FIG. 9. The embodiment in FIG. 9 utilizes a socket 200 having an axial fluid passage 202 and a relatively shallow recess 204 containing a gasket 206 at its distal end. An inwardly extending ring 208 surrounds the recess 204 at its outlet to form an inwardly stepped shoulder 210.

The socket 200 receives a plug 212 having a generally cylindrical sleeve 214 surrounding an axial fluid passage 216. A plurality of retaining fingers 218 are pivotally mounted on the sleeve 214 by mounting means 220. In the embodiment illustrated in FIG. 9, the mounting means include a ring of elastomeric material 222 extending between the retaining fingers 218 and sleeve 214. Although the elastomeric material 222 is bonded to both the retaining fingers 218 and sleeve 214, an outwardly extending ring 224 is formed on the sleeve 214 and a circumferential lip 226 extends inwardly from the fingers 218 to strengthen the interconnection between the elastomeric material 222 and the sleeve 214 and fingers 218. Each of the retaining fingers terminates in a respective locking tab 230 that fits over and is retained by the stepped shoulder 210 of the socket 200 when the plug 212 is inserted into the socket 200. A pair of axially spaced annular rings 232, 234 project outwardly from the sleeve 214. The upper ring 232 is spaced from the inner surfaces of the locking fingers 218 by a distance that is at least equal to the overlap of the retaining tab 230 on the stepped shoulder 210. As a result, the retaining fingers 218 are free to bend inwardly responsive to axial movement of the plug 212 to allow the retaining tabs 230 to clear the shoulder 210 in order to remove the plug 212 from the socket 200. However, if the plug 212 pivots responsive to a transverse force, the actuating ring 232 moves transversely to contact the inner surface of at least one retaining finger 218 to prevent its respective retaining tab 230 from moving inwardly to clear the stepped shoulder 210. The actuating ring 232 thus prevents the plug 212 from being removed from the socket 200.

Figure 10:
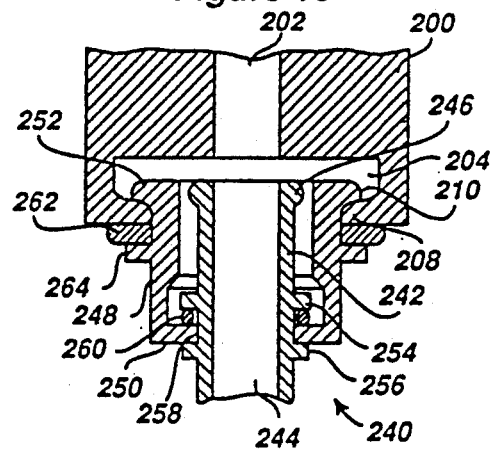
FIG. 10 is a cross-sectional view of another embodiment of the inventive fluid coupling also utilizing a plurality of resilient retaining fingers pivotally mounted on a sleeve.

While the embodiment of FIG. 9 utilizes a second annular ring 234 to cause the retaining fingers 218 to bend between the ring 234 and the tabs 230, it will be understood that they may be eliminated in the event that the mounting means 220 is capable of imparting a sufficient outwardly directed force to the retaining fingers 218. An example of an embodiment utilizing a single annular ring is illustrated in FIG. 10. In the embodiment of FIG. 10, the socket 200 is identical to the socket 200 of FIG. 9 with the exception that it does not include a gasket 206. Thus, both sockets have been designated with the same reference numerals where applicable. The embodiment of FIG. 10 utilizes a plug 240 having a sleeve 242 with an annular fluid passage 244 and an outwardly extending annular actuating ring 246 at its distal end. A plurality of retaining fingers 248 are mounted on the sleeve 242 by mounting means 250. Each of the retaining fingers 248 terminates in a respective retaining tab 252 that fits over and is captured by the inwardly step shoulder 210 formed by the inwardly extending ring 208 of the socket 200.

The mounting means 250 used to pivotally secure the retaining fingers 248 to the sleeve 242 include a pair of axially spaced rings 254, 256 extending around the circumference of the sleeve 242, and a circumferential ring 258 extending inwardly from the retaining fingers 248 between the two rings 254, 256. A resilient O-ring 260 is positioned between the inwardly extending ring 258 from the fingers 248 and the ring 254 extending outwardly from the sleeve 242. The O-ring 260 provides two functions. First, it permits the sleeve 242 to pivot within the retaining fingers 248, and it also acts as a seal to prevent fluid from escaping from the recess 204. An annular gasket 262, retained by outward projections 264 from the fingers 248, also prevents the fluid from escaping from the recess 204.

In operation, the plug 240 may be removed from the socket 200 by pulling the plug 240 axially of the socket 200. The retaining fingers 248 then bend inwardly to release the retaining tabs 252 from the inwardly step shoulder 210 of the socket 200. In the event that the sleeve 242 pivots responsive to transverse forces, the actuating ring 246 contacts at least one of the retaining fingers 248 to prevent its respective retaining tab 252 from clearing the shoulder 210, thereby preventing the plug 240 from being removed from the socket 200.

Figure 11:
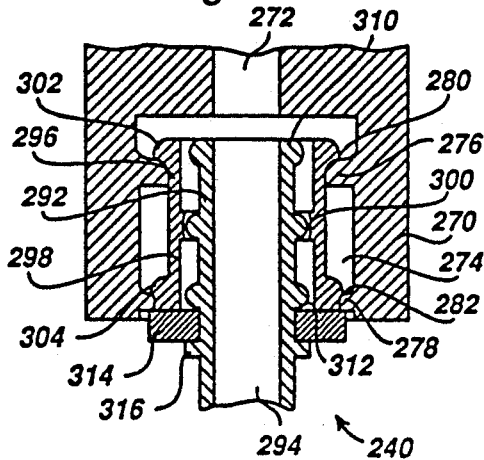
FIG. 11 is a cross-sectional view of another embodiment of the inventive fluid coupling utilizing two sets of resilient retaining fingers pivotally mounted on a sleeve including respective actuating means to lock the retaining fingers to the socket responsive to pivotal movement of the sleeve.

A final embodiment of the inventive fluid coupling is illustrated in FIG. 11. The embodiment of FIG. 11 is substantially similar to the embodiment of FIG. 10 except that it includes a second set of retaining fingers, a second actuating ring and a second inwardly stepped shoulder to capture the second set of retaining fingers. The socket 270 has an axial fluid passage 272 and a generally cylindrical recess 274 surrounded by two axially spaced, inwardly projecting rings 276, 278 forming respective inwardly stepped shoulders 280, 282. A plug 290 includes a cylindrical sleeve 292 having an axial fluid passage 294 and two sets of retaining fingers 296, 298 connected to the sleeve 292 through a common mounting structure 300. The retaining fingers 296, 298 terminate in respective retaining tabs 302, 304 that are captured behind respective stepped shoulders 280, 282 formed in the socket 270. A pair of annular actuating rings 310, 312 are formed on the sleeve 292 adjacent each set of retaining tabs 302, 304, respectively. A cylindrical gasket 314 surrounds the sleeve 292 between the actuating ring 312 and an outwardly extending ring 316 to prevent fluid from escaping from the recess 274.

In operation, the plug 290 may be withdrawn from the socket 270 by pulling the plug 290 axially, thereby allowing the retaining fingers 296, 298 to deflect inwardly so that their respective tabs 302, 304 clear the stepped shoulders 280, 282, respectively. However, pivotal movement of the sleeve 292 responsive to transverse forces applied to the plug 290 cause the actuating rings 310, 312 to move transversely in opposite directions to contact the inner surfaces of at least one retaining finger 296, 298 of each set, thereby preventing the respective retaining tabs 302, 304 from clearing the stepped shoulders 280, 282, respectively.

It is thus seen that the inventive quick disconnect fluid coupling is relatively simple, light in weight and easy to use, yet prevents transverse forces exerted on the connector from inadvertently disconnecting the fluid coupling.

I claim:

1. A quick disconnect fluid coupling, comprising:
   a socket having a generally cylindrical recess with a fluid opening at its distal end, said socket having formed therein a radially inwardly stepped shoulder surrounding said recess; and
   a plug sealingly fitting into the proximal end of the recess of said socket, said plug including a sleeve having a fluid opening at its distal end, and a plurality of resilient retaining fingers coaxially surrounding said sleeve, said fingers extending axially along said sleeve and terminating in respective radially outwardly projecting retaining tabs adapted to be captured behind the stepped shoulder of said pocket when said plug is inserted into said recess, said plug further including mounting means for pivotally mounting said sleeve within said fingers while preventing said fingers from moving axially with respect to said sleeve, said plug further including an actuating member projecting radially outwardly from said sleeve toward said retaining fingers at a location axially spaced from said mounting means, said actuating member contacting at least one of said fingers when said sleeve is pivoted within said fingers about said mounting means to force said fingers radially outwardly so that their respective retaining tabs are held behind said stepped shoulder, thereby preventing said plug from being withdrawn from said socket, said retaining fingers resiliently retaining said plug within said socket and allowing said plug to be removed from said socket when said sleeve and said retaining fingers are substantially in axial alignment by exerting an axial force on said plug, thereby displacing said retaining fingers inwardly to release said plug from said socket.

2. The fluid coupling of claim 1 wherein said mounting means comprise a body of elastomeric material surrounding a portion of said sleeve and extending between said sleeve and retaining fingers.

3. The fluid coupling of claim 1 wherein said mounting means comprise a pair of axially spaced rings extending around the circumference of said sleeve, a circumferential ring extending inwardly from said retaining fingers and being positioned between the rings extending around the circumference of said sleeve, and a resilient O-ring surrounding said sleeve and being positioned between the ring extending inwardly from said retaining fingers and one of the rings surrounding said sleeve.

4. The fluid coupling of claim 1, further including a gasket positioned against the distal end of said recess and surrounding the fluid opening in said socket, the end of said plug compressively contacting said gasket when said plug is inserted into said socket whereby said gasket seals the interconnection between said plug and socket.

5. The fluid coupling of claim 1, further including an annular gasket surrounding said sleeve, said gasket tightly abutting the proximal end of said socket when said plug is inserted into said recess.

6. The fluid coupling of claim 1 wherein said socket further includes a second radially inwardly stepped shoulder surrounding said recess and being axially spaced from said first radially inwardly stepped shoulder, and wherein said plug further includes a second plurality of retaining fingers coaxially surrounding said sleeve, said second plurality of fingers extending axially along said sleeve from said mounting means in a direction opposite from the direction that said first mounting means extends from said mounting means, said second plurality of fingers terminating in respective radially outwardly projecting retaining tabs adapted to be captured behind the second stepped shoulder of said socket when said plug is inserted into said recess, and a second actuating member projecting radially outwardly from said sleeve toward said second plurality of retaining fingers at a location axially spaced from said mounting means, whereby pivotal movement of said plug within said socket causes said first and second actuating members to contact respective retaining fingers on opposite sides of said sleeve, thereby holding their respective retaining tabs behind said first and second step shoulders.

* * * * *